United States Patent
Kitamura et al.

(10) Patent No.: US 10,905,974 B2
(45) Date of Patent: Feb. 2, 2021

(54) SLUDGE TREATMENT APPARATUS

(71) Applicant: SUIDO KIKO KAISHA, LTD., Tokyo (JP)

(72) Inventors: Akihiro Kitamura, Tokyo (JP); Daisuke Naitou, Tokyo (JP)

(73) Assignee: SUIDO KIKO KAISHA, LTD., Tokyo (JP)

( * ) Notice: Subject to any disclaimer, the term of this patent is extended or adjusted under 35 U.S.C. 154(b) by 0 days.

(21) Appl. No.: 16/640,245

(22) PCT Filed: Aug. 23, 2017

(86) PCT No.: PCT/JP2017/030064
§ 371 (c)(1),
(2) Date: Feb. 19, 2020

(87) PCT Pub. No.: WO2019/038842
PCT Pub. Date: Feb. 28, 2019

(65) Prior Publication Data
US 2020/0246725 A1    Aug. 6, 2020

(51) Int. Cl.
*B01D 21/20* (2006.01)
*B01D 21/24* (2006.01)
*B01D 21/18* (2006.01)

(52) U.S. Cl.
CPC ............. *B01D 21/20* (2013.01); *B01D 21/18* (2013.01); *B01D 21/245* (2013.01)

(58) Field of Classification Search
CPC ........ B01D 21/04; B01D 21/12; B01D 21/18; B01D 21/20; B01D 21/245
(Continued)

(56) References Cited

U.S. PATENT DOCUMENTS

| | | | | |
|---|---|---|---|---|
| 1,918,742 A | * | 7/1933 | Elrod | B01D 21/18 210/527 |
| 2,101,079 A | * | 12/1937 | Lund | B01D 21/04 210/527 |

(Continued)

FOREIGN PATENT DOCUMENTS

| | | |
|---|---|---|
| CN | 101530682 A | 9/2009 |
| JP | S51-117447 A | 10/1976 |

(Continued)

OTHER PUBLICATIONS

PCT/ISA/210, "International Search Report for International Application No. PCT/JP2017/030064," dated Sep. 26, 2017.

*Primary Examiner* — Christopher Upton
(74) *Attorney, Agent, or Firm* — Manabu Kanesaka

(57) ABSTRACT

A traveling direction of a sludge drawing tool can be reversed regardless of the position of the sludge drawing tool. An endless chain is wound around a pair of wheels, and has straight lines L1 and L2 extending therebetween, and a pulling portion is provided in a part thereof. A sludge drawing tool is arranged to be able to move forward between the wheels. The sludge drawing tool is provided with engagement portions having a shape enabling the pulling portion circumferentially moving along the chain to be engaged therewith and disengaged therefrom. When the driving wheel rotates in a forward direction, the engagement portion comes into contact with the pulling portion circumferentially moving along the straight line L1 in a drawing direction, to make the sludge drawing tool move in the drawing direction. During the rotation in the forward direction, the engagement portion comes into contact with the pulling portion.

5 Claims, 8 Drawing Sheets

(58) Field of Classification Search
USPC .................................................. 210/527, 803
See application file for complete search history.

(56) References Cited

U.S. PATENT DOCUMENTS

| | | | | |
|---|---|---|---|---|
| 3,498,466 | A * | 3/1970 | Fechter | B01D 21/245 210/527 |
| 4,927,537 | A * | 5/1990 | Meurer | B01D 21/04 210/527 |
| 5,478,471 | A * | 12/1995 | Fujiwara | B01D 21/20 210/527 |
| 6,199,704 | B1 * | 3/2001 | Fujiwara | B01D 21/20 210/527 |
| 2013/0153491 | A1 * | 6/2013 | Fujiwara | B01D 21/18 210/527 |

FOREIGN PATENT DOCUMENTS

| | | |
|---|---|---|
| JP | H06-029605 U | 4/1994 |
| JP | 2603973 U | 2/2000 |
| JP | 2005-021874 A | 1/2005 |

\* cited by examiner

Fug.12
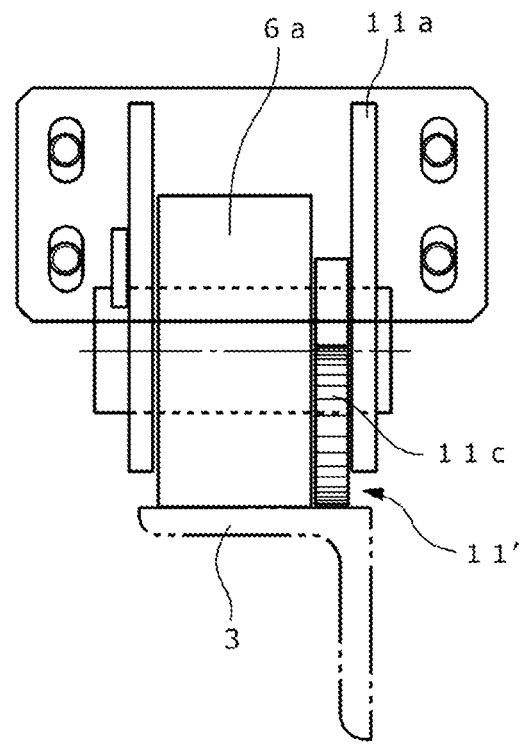
Fig.13
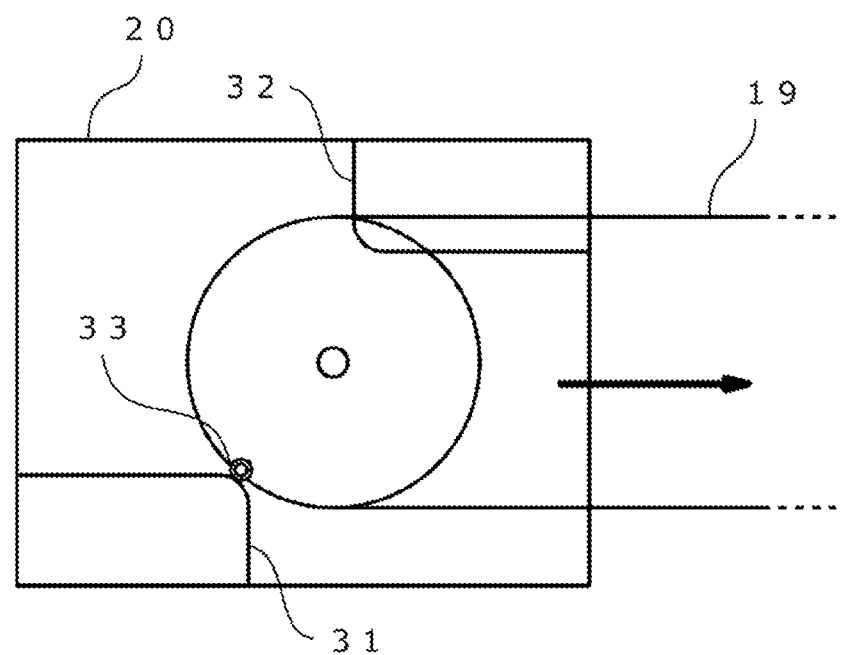

SLUDGE TREATMENT APPARATUS

RELATED APPLICATIONS

The present application is National Phase of International Application No. PCT/JP2017/030064 filed Aug. 23, 2017, the disclosure of which is hereby incorporated by reference herein in its entirety.

TECHNICAL FIELD

The present invention relates to a sludge treatment apparatus for treating sludge settled in a water tank, and more particularly, to a forward movement mechanism for a scraper that draws up the sludge.

BACKGROUND ART

Conventionally, there has been known a sludge treatment apparatus for treating sludge settled on the bottom of a tank through forward movement of a scraper that draws up the sludge settled in the tank. Patent Literature 1 discloses an example of a sludge scraping apparatus including an endless circulation driving member wound around a pair of wheels. Pulling power is transmitted via this circulation driving member to cause the forward movement of the scraper. As illustrated in FIG. 13, a traveling body 20 including the scraper is provided with engagement reception surfaces 31 and 32 that come into contact with an engagement portion 33 on an endless circulation driving member 19. The endless circulation driving member 19 continuously rotates with the rotation direction fixed. As a result, the engagement portions 33 moving along the endless circulation driving member 19 alternately come into contact with the engagement reception surfaces 31 and 32, and the traveling body 20 moves alternately in one direction and the opposite direction.

CITATION LIST

Patent Literature

Patent Literature 1: Utility model registration No. 2603973

SUMMARY OF INVENTION

Technical Problem

In the above-described conventional technique, the traveling direction is reversed at the end of the movable range of the scraper. The traveling direction cannot be reversed in the middle of the movable range, in other words, in the middle of the movement of the sludge drawing tool.

In view of this, an object of the present invention is to make the traveling direction reversible regardless of the position of the scraper.

Solution to Problem

The present invention provides a sludge treatment apparatus including a pair of wheels including a driving wheel; a power transmission member that is endlessly formed and is provided with a pulling portion; and a moving body provided with first to fourth engagement portions. The power transmission member is wound around the pair of wheels, and includes a first straight line and a second straight line extending between the pair of wheels. The moving body is provided to be able to move forward between the pair of wheels and includes a scraper for drawing in sludge. The first to the fourth engagement portions have a shape enabling the pulling portion that circumferentially moves along the power transmission member to engage with and to be disengaged from the first to the fourth engagement portions. The first engagement portion is provided near the first straight line, and comes into contact with the pulling portion moving on the first straight line in one direction to make the moving body move in the one direction when the driving wheel rotates in one direction. The second engagement portion is provided near the second straight line, and comes into contact with the pulling portion moving in an opposite direction on the second straight line to make the moving body move in the opposite direction when the driving wheel rotates in the one direction. The third engagement portion is provided near the first straight line and at a position different from the first engagement portion, and comes into contact with the pulling portion moving in the opposite direction on the first straight line to move the moving body in the opposite direction when the driving wheel rotates in an opposite direction. The fourth engagement portion is provided near the second straight line and at a position different from the second engagement portion, and comes into contact with the pulling portion moving in the one direction on the second straight line to make the moving body move in the one direction when the driving wheel rotates in the opposite direction.

In this embodiment, the third engagement portion is preferably provided at a position opposite to the second engagement portion, and the fourth engagement portion is preferably provided at a position opposite to the first engagement portion. Furthermore, the third engagement portion is preferably shaped to be line symmetrical with the second engagement portion with respect to an axis of symmetry connecting center axes of the pair of wheels, and the fourth engagement portion is preferably shaped to be line symmetrical with the first engagement portion with respect to the axis of symmetry.

In the present invention, the moving body may include a carriage to which the scraper is rotatably attached, a slide portion, and a link mechanism. The carriage has a wheel for moving on a rail. The slide portion is provided to the carriage to be slidable within a predetermined movable range, and includes the first to the fourth engagement portions. The link mechanism couples the slide portion and the scraper to each other and makes the scraper rotate in accordance with sliding of the slide portion with respect to the carriage. In this case, the slide portion is preferably attached on a lower side of the carriage, and the power transmission member is preferably provided through an inside of the slide portion.

Advantageous Effects of Invention

According to the present invention, the moving body including the scraper moves forward with the pulling portion alternately coming into contact with the first and the second engagement portions when the driving wheel rotates in one direction, and moves forward with the pulling portion alternately coming into contact with the third and the fourth engagement portions when the driving wheel rotates in the opposite direction. To reverse the traveling direction in the middle of the movement of the moving body, the driving wheel is reversed. As a result, the pulling portion that has been in contact with one engagement portion (the first engagement portion, for example) moves on the straight line and comes into contact with another engagement portion (the third engagement portion, for example) arranged on the same straight line, so that the traveling direction of the moving body is reversed. As a result, the traveling direction can be reversed at any desired position during the movement of the moving body.

BRIEF DESCRIPTION OF DRAWINGS

FIG. 12 is a front view of a wheel with stopper according to a modification.
FIG. 13 is an explanatory view of a conventional technique.

DESCRIPTION OF EMBODIMENTS

Figure 1:
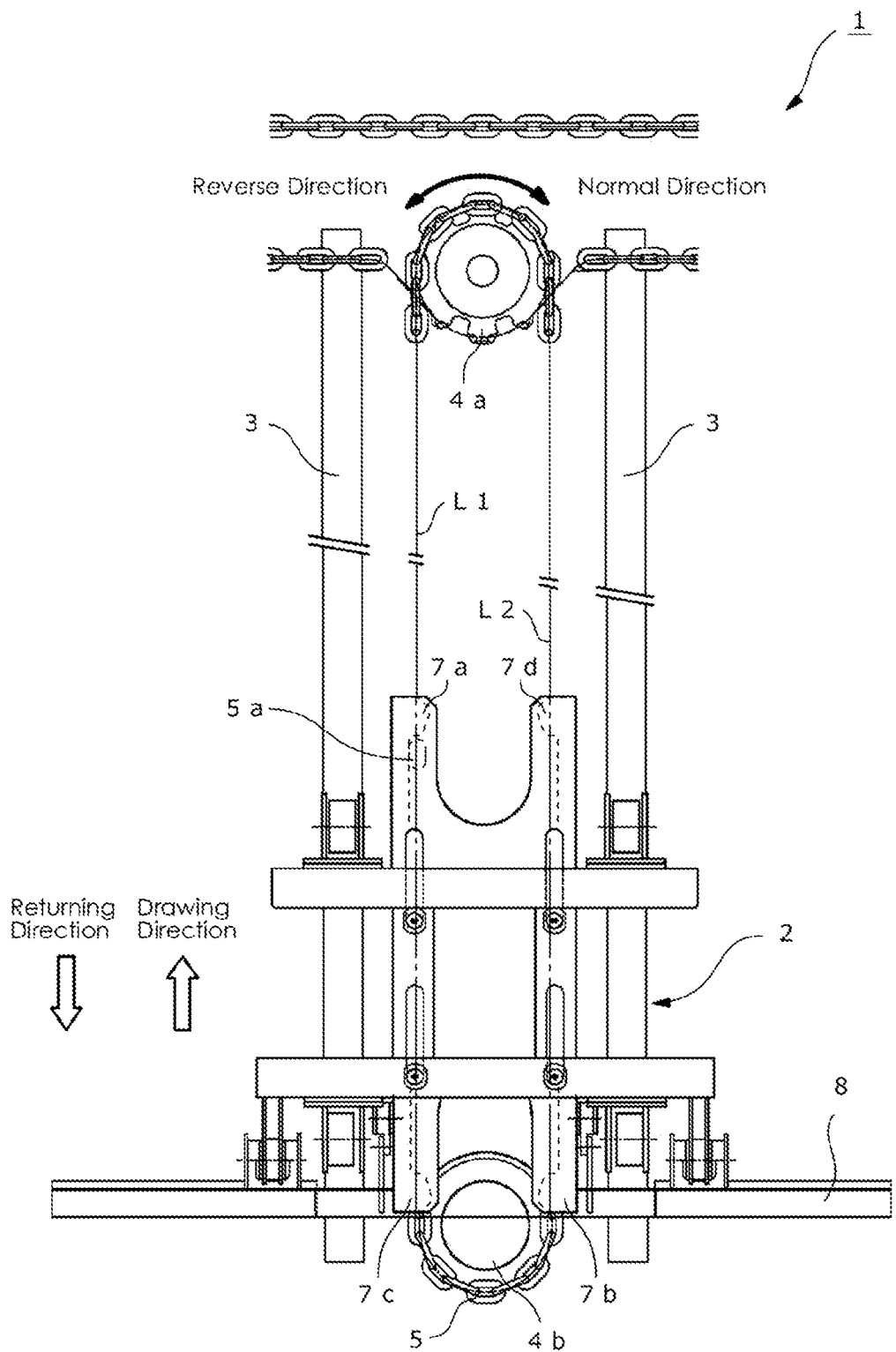
FIG. 1 is a top view of a sludge treatment apparatus.

FIG. 1 is a top view of a sludge treatment apparatus according to the present embodiment. The sludge treatment apparatus 1 is arranged on the bottom of a tank containing treatment target water, for drawing up and discharging the sludge settled in the tank using a scraper 8. The sludge treatment apparatus 1 mainly includes a sludge drawing tool 2 that is a moving body having the scraper 8 for drawing up the sludge, rails 3, a pair of wheels 4a and 4b, and a chain 5 serving as a power transmission member. The present embodiment features the following three points. The first point is that the sludge drawing tool 2 makes forward movement between the pair of wheels 4a and 4b, that is, moves alternately in a drawing direction and a returning direction, simply by continuously rotating the driving wheel 4a in one direction. The second point is that the scraper 8 that is a component of the sludge drawing tool 2 moves upward and downward in accordance with the traveling direction of the sludge drawing tool 2. Specifically, the scraper 8 moves downward in response to the movement in the drawing direction for drawing in the sludge, and moves upward in response to the movement in the returning direction. The third point is that the movement direction of the sludge drawing tool 2 can be freely switched, even during the movement of the sludge drawing tool 2. Thus, reversing to the returning direction can be implemented in the middle of the movement in the drawing direction, and reversing to the drawing direction can be implemented in the middle of the movement in the returning direction.

The two rails 3 are arranged in parallel to each other on the bottom of the tank. At one end of the rails 3, that is, in an end portion in the drawing direction, the bottom of the tank is depressed to be formed into a pit for discharging the sludge. The pair of wheels 4a and 4b are provided at both ends of the rails 3. In the present embodiment, the driving wheel 4a is disposed at the end in the drawing direction, and the driven wheel 4b is disposed at the end in the returning direction. It is to be noted that, driving force can also be transmitted to the sludge drawing tool 2 with the wheels 4a and 4b arranged oppositely, that is, with the driving wheel 4a disposed at the end in the returning direction.

The chain 5 is an endless power transmission member that is wound around the pair of wheels 4a and 4b. The chain 5 includes two semicircular arc-shaped curved lines extending along the outer circumferences of the respective wheels 4a and 4b and two straight lines L1 and L2 extending between the wheels 4a and 4b. Note that a belt or the like may be used instead of the chain 5 as a member for transmitting driving force to the sludge drawing tool 2.

The driving force from a driving source such as a motor (not illustrated) is transmitted to the driving wheel 4a via a chain provided separately from the chain 5, to rotate the driving wheel 4a. When the driving wheel 4a rotates, the chain 5 wound around the wheels 4a and 4b moves, so that the driving force is transmitted to the sludge drawing tool 2. The driving wheel 4a rotate in any of the normal direction and the reverse direction, by switching the rotation direction of the driving source.

Power transmission from the driving source to the driving wheel 4a via the chain provides an advantage that the number of sludge treatment apparatuses 1 arranged in parallel can be adjusted flexibly and inexpensively. However, if such an effect needs not to be taken into consideration, for example, the driving wheel 4a may be directly attached to a rotation shaft of the driving source arranged above the driving wheel 4a.

Figure 2:
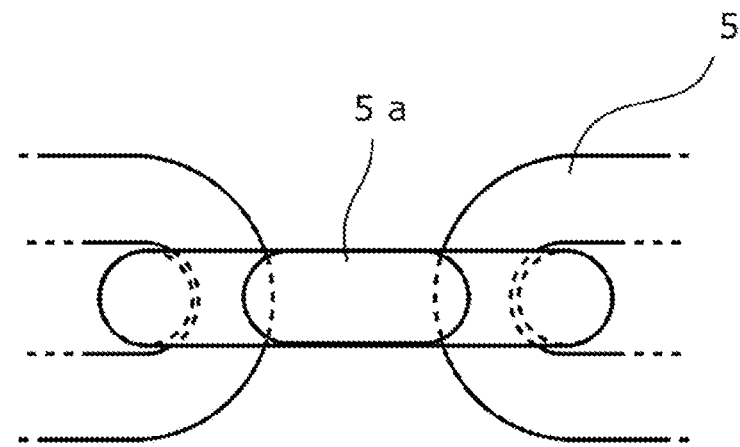
FIG. 2 is a top view of a chain.
Figure 3:
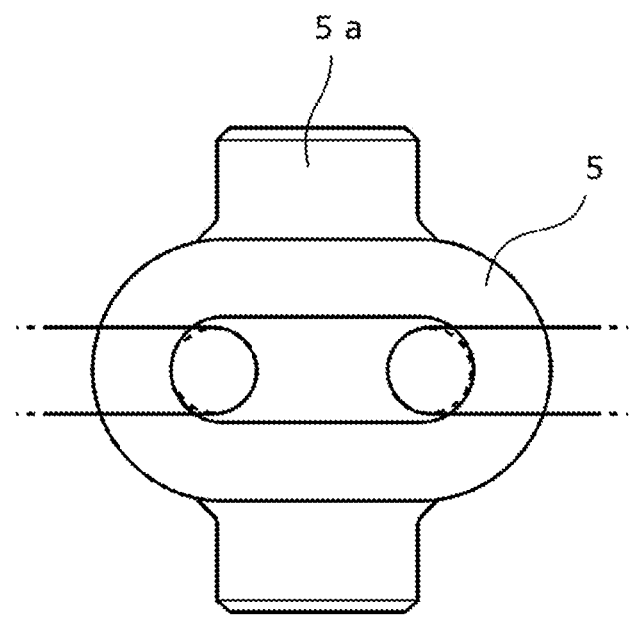
FIG. 3 is a side view of the chain.

FIG. 2 is a top view of the chain 5, and FIG. 3 is a side view thereof. A pulling portion 5a having a pin-like shape protruding in a predetermined direction is attached to a part of the chain 5 by welding or the like. The pulling portion 5a is provided so as to protrude upward in the top view of FIG. 1, but may be provided so as to protrude laterally outward in the figure. The pulling portion 5a may have any shape as long as engagement portions 7a to 7d described later can be free engage therewith and disengaged therefrom. An example such a shape includes a hook shape. The pulling portion 5a can circumferentially move along the chain 5 as the driving wheel 4a rotates.

The sludge drawing tool 2 is arranged on the two rails 3, and can freely move forward in the drawing direction and in the returning direction between the pair of wheels 4a and 4b. As illustrated in FIG. 1, the sludge drawing tool 2 is provided with the four engagement portions 7a to 7d, and is pulled in the drawing direction and in the returning direction with the pulling portion 5a, circumferentially moving along the chain 5, coming into contact with any of the engagement portions 7a to 7d.

Figure 4:
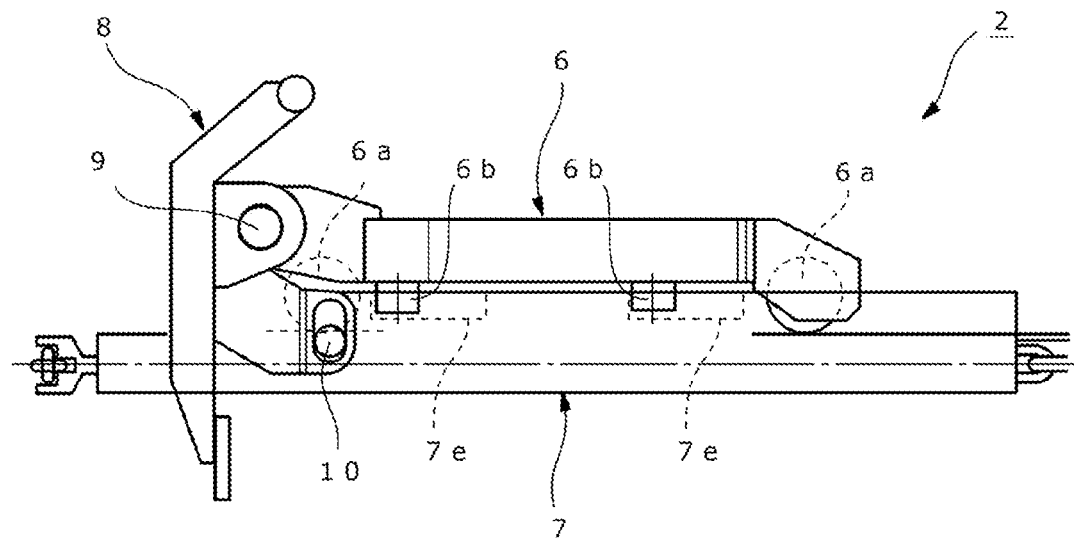
FIG. 4 is a side view of a sludge drawing tool.

FIG. 4 is a side view of the sludge drawing tool 2. The sludge drawing tool 2 mainly includes a carriage 6, a slide portion 7, and the scraper 8. The carriage 6 includes a plurality of wheels 6a for moving on the two rails 3, to be movable on the rail 3. Furthermore, the carriage 6 has a lower surface provided with a protruding portion 6b protruding downward.

The slide portion 7 is slidably attached to the lower side of the carriage 6. The slide portion 7 has an upper surface provided with a depression extending for a predetermined length, along the movement direction of the sludge drawing tool 2, to serve as a guide groove 7e. The protruding portion 6b on the carriage 6 side is inserted in the guide groove 7e. As a result, the movable (slidable) range of the slide portion 7 with respect to the carriage 6 is limited to a range defined by the guide groove 7e.

Figure 5:
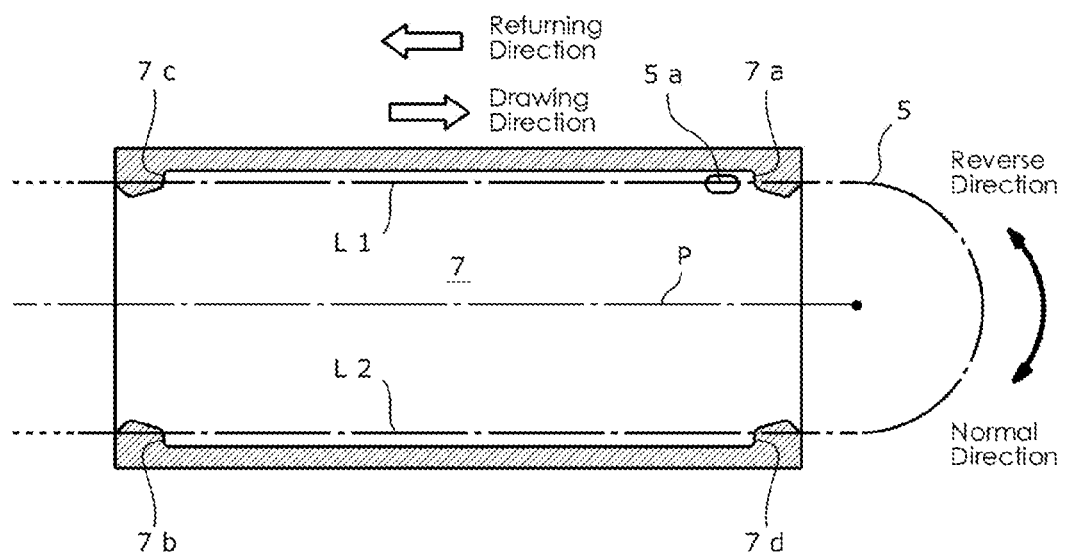
FIG. 5 is a schematic top view of a slide portion.

FIG. 5 is a schematic top view of the slide portion 7. The chain 5 is provided through the inside of the slide portion 7 having both side surfaces provided with the above-described four engagement portions 7a to 7d. These engagement portions 7a to 7d protrude toward the chain 5, and are shaped to enable the pulling portion 5a, circumferentially moving along the chain 5, to be engaged therewith and to be disengaged therefrom. The engagement portions 7a and 7c are provided at different positions near the straight line L1, and the engagement portions 7b and 7d are provided at different positions near the straight line L2. The engagement portions 7a and 7d are provided at opposite positions, and have shapes that are line-symmetric about an axis of symmetry P connecting the center axes of the pair of wheels 4a and 4b. Furthermore, the engagement portions 7b and 7c are provided at opposite positions and have shapes that are line-symmetric about the axis of symmetry P.

When the driving wheel 4a rotates in the normal direction, the slide portion 7 (sludge drawing tool 2) is pulled by means of the engagement portions 7a and 7b. Specifically, when the driving wheel 4a rotates in the normal direction, the engagement portion 7a comes into contact with the pulling portion 5a moving in the drawing direction on the straight line L1, to make the slide portion 7 move in the drawing direction. The engagement portion 7b comes into contact with the pulling portion 5a moving on the straight line L2 in the returning direction, to make the slide portion 7 move in the returning direction.

When the driving wheel 4a rotates in the reverse direction, the slide portion 7 (sludge drawing tool 2) is pulled by means of the engagement portions 7c and 7d. Specifically, when the driving wheel 4a rotates in the reverse direction, the engagement portion 7c comes into contact with the pulling portion 5a moving in the returning direction on the straight line L1, to make the slide portion 7 move in the returning direction. The engagement portion 7d comes into contact with the pulling portion 5a moving on the straight line L2 in the drawing direction, to make the slide portion 7 move in the drawing direction.

Figure 6:
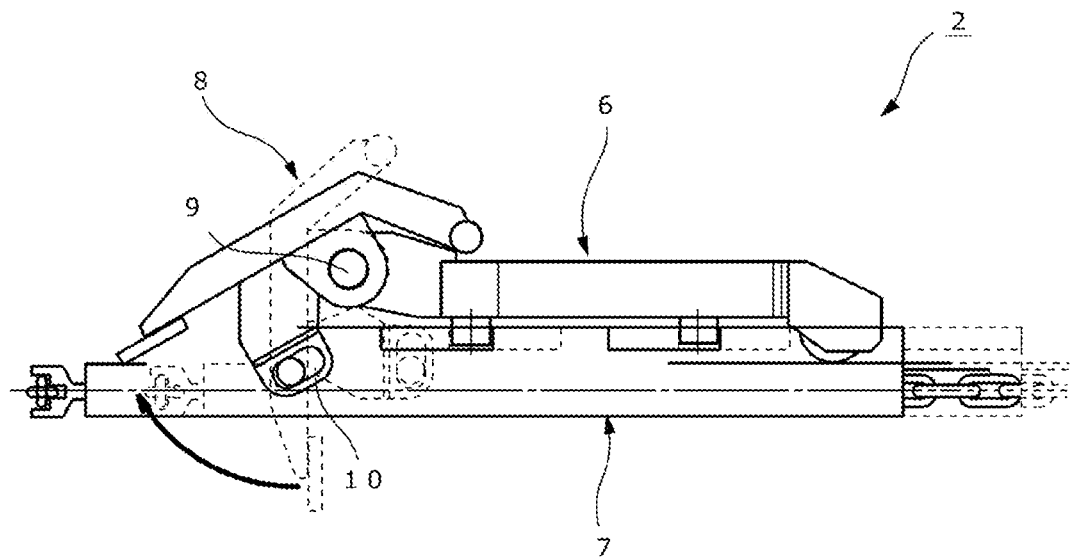
FIG. 6 is an explanatory view of an operation for moving a scraper upward and downward.

The scraper 8 extends substantially orthogonally to the rails 3, and has a shape to draw in the sludge settled in the tank. The scraper 8 is attached to the carriage 6 via a rotation shaft 9, as illustrated in FIG. 4. Furthermore, a link mechanism 10 is provided between the slide portion 7 and the scraper 8 to couple these elements to each other. The link mechanism 10 rotates the scraper 8 in accordance with the sliding of the slide portion 7 with respect to the carriage 6. Thus, the scraper 8 moves upward and downward. Specifically, as illustrated in FIG. 6, in a state where the slide portion 7 is pulled out toward the right side with respect to the carriage 6 (a state indicated by a broken line), the scraper 8 is lowered. As the slide portion 7 in this state is pushed toward the left side, the scraper 8 gradually rises. When the slide portion 7 is completely pushed in, the scraper 8 is completely raised. The scraper 8 is gradually lowered as the slide portion 7 is pulled out toward the right side after being pushed toward the left side relative to the carriage 6 to completely raise the scraper 8. Then, when the slide portion 7 is completely pulled out, the scraper 8 is completely lowered.

Figure 7:
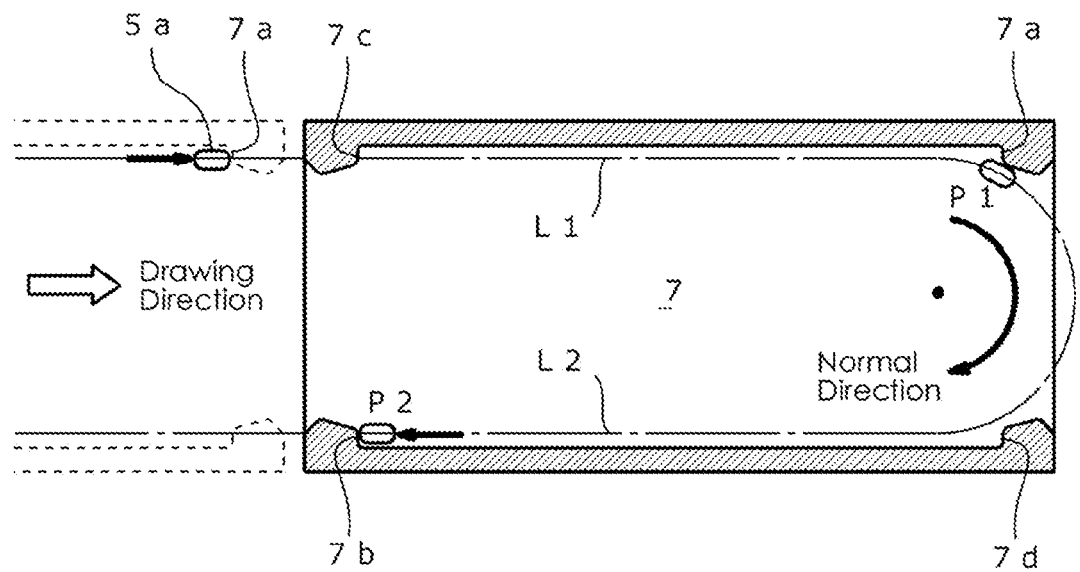
FIG. 7 is an explanatory view of a forward movement of the sludge drawing tool caused by a rotation of a driving wheel in a forward direction.

Next, an operation of the sludge drawing tool 2 will be described. FIG. 7 is an explanatory view of a forward movement of the sludge drawing tool 2 caused by the forward rotation of the driving wheel 4a. For example, the pulling portion 5a moving on the straight line L1 of the chain 5 in the drawing direction comes into contact with the engagement portion 7a. As a result, the slide portion 7 (sludge drawing tool 2) moves in the drawing direction until the pulling portion 5a reaches the end of the straight line L1, with the lowered state (a state for scraping the sludge) of the scraper 8 maintained. Upon reaching the end of the straight line L1, the pulling portion 5a starts to move on the curved line along the outer circumference of the driving wheel 4a, to gradually move away from the engagement portion 7a. Then, when the pulling portion 5a reaches a position P1 to be disengaged from the engagement portion 7a, the slide portion 7 (sludge drawing tool 2) stops while maintaining the lowered state (end position).

After moving on the curved line, the pulling portion 5a enters the straight line L2. In this process, the entrance of the pulling portion 5a will not be hindered by the engagement portion 7d at the end position where the slide portion 7 has stopped, because the engagement portions 7a and 7d have the same protruding height. Then, the pulling portion 5a reaches a position P2 on the straight line L2 to come into contact with the engagement portion 7b. Thus, the slide portion 7 starts to move in the returning direction that is opposite to the drawing direction. The resistance against the sliding of the slide portion 7 on the carriage 6 is smaller than the resistance against the movement the carriage 6 on the rail 3. Thus, the movement of the pulling portion 5a after passing through the position P2 results in the slide portion 7 sliding with respect to the carriage 6. As a result, the scraper 8 that has been lowered starts to rise. Then, when the pulling portion 5a moves to the end of the movable range defined by the guide groove 7e, the scraper 8 is completely raised, and the carriage 6 and the slide portion 7 integrally moves in the returning direction as the sludge drawing tool 2.

The same applies to the operation on the driven wheel 4b side. Specifically, when the pulling portion 5a is disengaged from the engagement portion 7b, the sludge drawing tool 2 stops in the raised state. Then, the scraper 8 starts to be lowered when the pulling portion 5a comes into contact with the engagement portion 7a. When the scraper 8 is completely lowered, the sludge drawing tool 2 moves in the drawing direction.

The reverse rotation of the driving wheel 4a results in an operation that is basically the same as the operation described above. However, in this case, the forward movement of the sludge drawing tool 2 involving upward and downward movement of the scraper 8 occurs with the pulling portion 5a alternately coming into contact with the engagement portions 7c and 7d instead of the engagement portions 7a and 7b.

In this manner, the forward movement of the sludge drawing tool 2 involving the upward and downward movement of the scraper 8 can be automatically implemented simply by rotating the driving wheel 4a in a predetermined direction. This is advantageous in that no sensor needs to be provided for detecting the end position of the sludge drawing tool 2 and that the driving wheel 4a needs not to be alternately rotated in the forward and the reverse directions.

Figure 8:
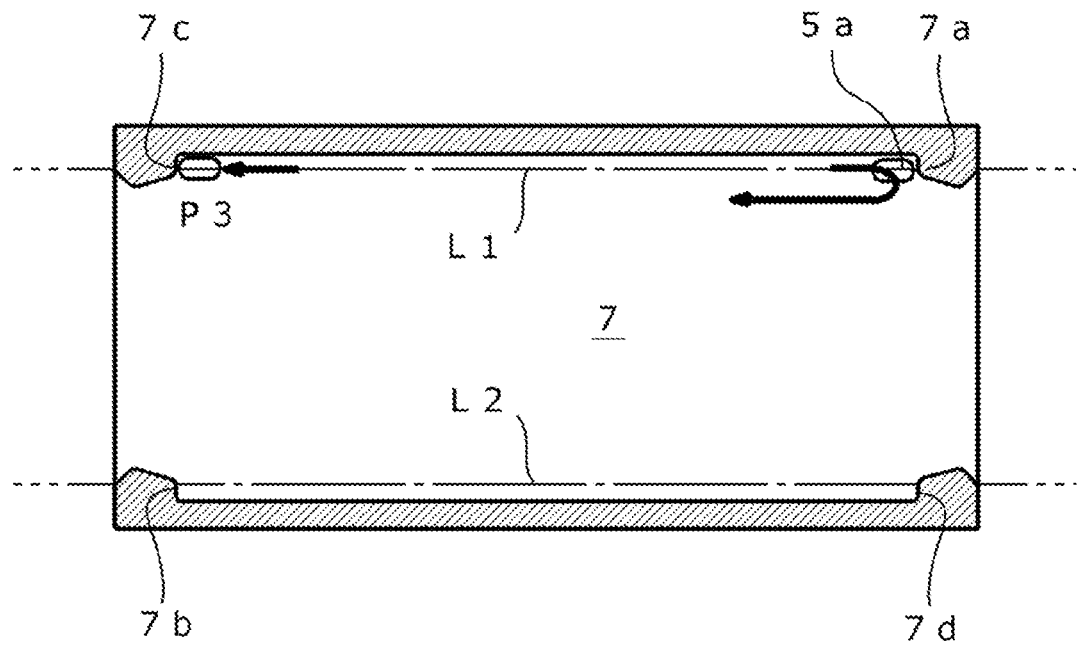
FIG. 8 is an explanatory view illustrating how the sludge drawing tool is reversed in the middle of a movement.

FIG. 8 is an explanatory view illustrating how the sludge drawing tool 2 is reversed in the middle of a movement. For example, the pulling portion 5a moving on the straight line L1 of the chain 5 in the drawing direction comes into contact with the engagement portion 7a. As a result, the slide portion 7 (sludge drawing tool 2) moves in the drawing direction with the lowered state of the scraper 8 maintained. If the driving wheel 4a is reversed during this movement, the pulling portion 5a on the straight line L1 starts to move in the opposite direction. As a result, the pulling portion 5a is disengaged from the engagement portion 7a, and the sludge drawing tool 2 stops with the lowered state maintained.

The pulling portion 5a moving on the straight line L1 reaches a position P3 to come into contact with the engagement portion 7c arranged on the same straight line L1. As a result, the scraper 8 starts to rise. When the scraper 8 is completely raised, the sludge drawing tool 2 moves in the returning direction.

The operation described above occurs as a result of making the driving wheel 4a that has been rotating in the forward direction rotate in the reverse direction. An operation as a result of making the driving wheel 4a that has been rotating in the reverse direction rotate in the forward direction is basically the same. However, in this case, the reverse movement of the sludge drawing tool 2 involving upward and downward movement of the scraper 8 occurs with the pulling portion 5a coming into contact with the engagement portions 7c and 7d one by one, instead of the engagement portions 7a and 7b.

Figure 9:
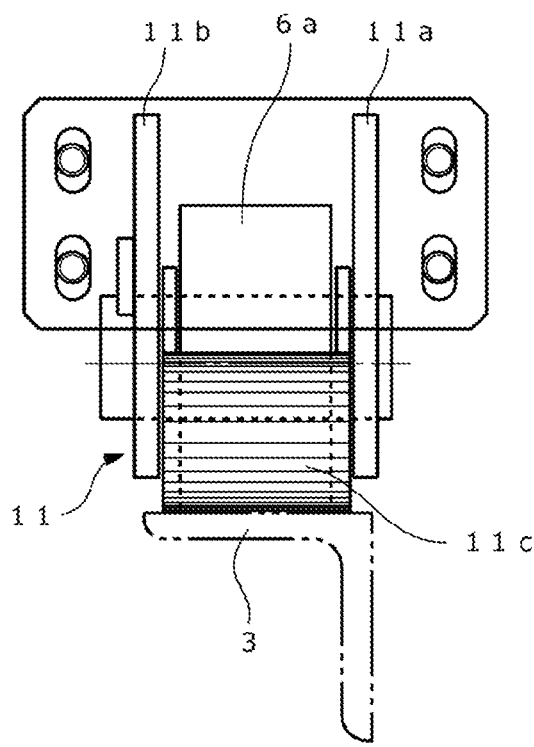
FIG. 9 is a front view of a wheel with stopper.
Figure 10:
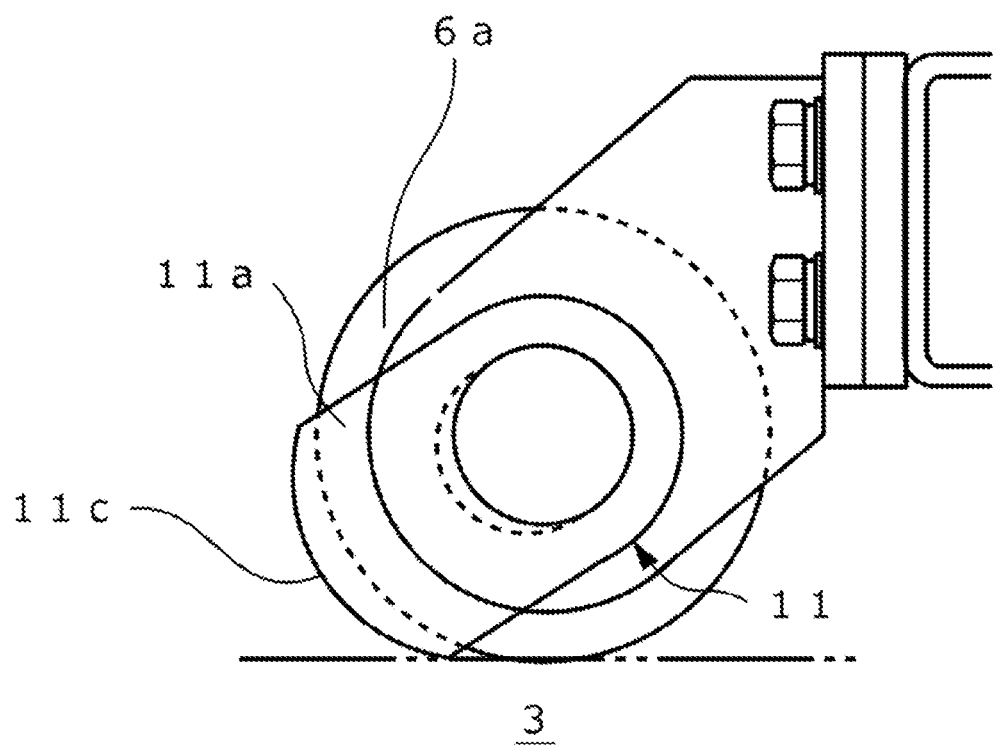
FIG. 10 is a side view of the wheel with a stopper.

A stopper for achieving temporary braking of the carriage 6 may be provided to ensure that the carriage 6 does not move during the raising and lowering processes of the scraper 8. FIG. 9 is a front view of a wheel with a stopper as an example, and FIG. 10 is a side view thereof. This stopper 11 is made of metal and has a pair of arms 11a and 11b and a contact portion 11c. The pair of arms 11a and 11b are eccentrically and rotatably mounted on the rotation shaft of the wheel 6a. The contact portion 11c is integrally provided to the tips of these arms 11a and 11b, to come into contact with the rails 3 for generating frictional force (braking force). The contact portion 11c protrudes beyond the outer circumference of the wheel 6a, and has a curved outer circumference surface processed (knurled) to have recesses and protrusions for applying strong braking force to the carriage 6.

Figure 11A:
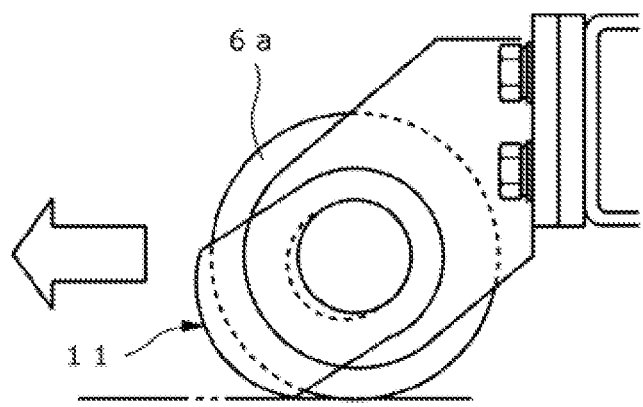
FIGS. 11(a), 11(b) and 11(c) are explanatory diagrams of an operation of the stopper.
Figure 11B:
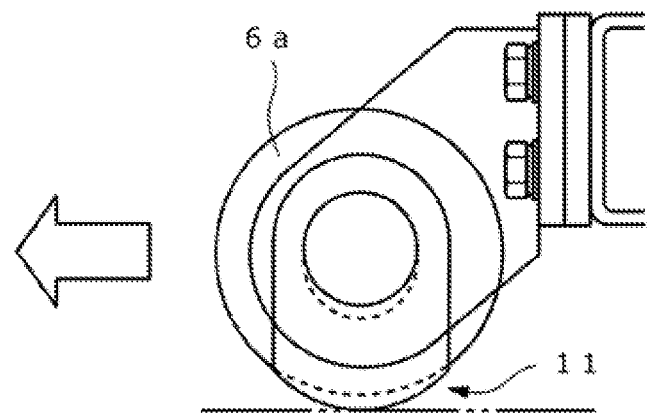
Figure 11C:
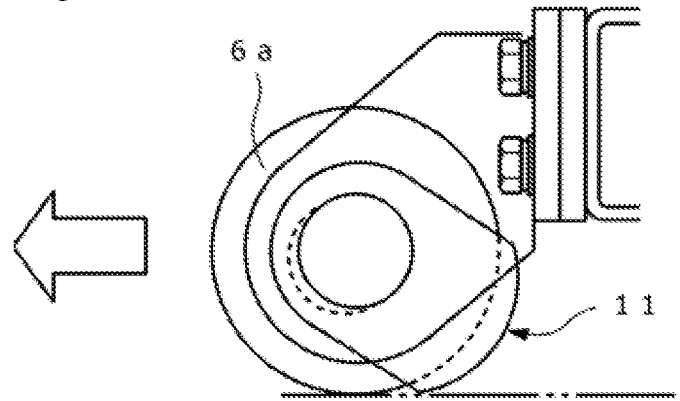

FIGS. 11(a), 11(b) and 11(c) are diagrams illustrating an operation of the stopper 11. As illustrated in FIG. 11(a) of the figure, the stopper 11 is positioned on the travelling direction side (obliquely forward) at a timing when the sludge drawing tool 2 is reversed. In this state, the carriage 6 receives a predetermined amount of braking force due to the frictional force between the stopper 11 and the rails 3 based on the weight of the stopper 11 and the effect of the stopper 11, positioned obliquely forward, being stuck to the rails 3. As a result, the carriage 6 stops without being dragged by the slide portion 7, meaning that only the slide portion 7 slides until reaching the end of the movable range.

Then, when the slide portion 7 sliding on the carriage 6 reaches the end of the movable range, the force transmitted to the slide portion 7 via the chain 5 directly acts on the carriage 6. As a result, the wheel 6a moves over the stopper 11 as illustrated in FIG. 11(b) of the figure. Thus, the stopper 11 is located on the opposite side (obliquely rearward) in the traveling direction as illustrated in FIG. 11(c) of the figure. Thus, the braking force to the carriage 6 is released, whereby the carriage 6 and the slide portion 7 integrally moves in the traveling direction.

FIG. 12 is a front view of a wheel with a stopper according to a modification. This stopper 11' has one arm 11a with a distal end surface provided with the above-mentioned contact portion 11c. In this case, the contact portion 11c has a smaller are than in the configuration of FIG. 9, but can guarantee a certain amount of braking force.

As described above, according to the present embodiment, the sludge drawing tool 2 moves forward with the pulling portion 5a alternately coming into contact with the engagement portions 7a and 7b when the driving wheel 4a rotates in the forward direction, and moves forward with the pulling portion 5a alternately coming into contact with the engagement portions 7c and 7d when the driving wheel 5a rotates in the reverse direction. To reverse the traveling direction in the middle of the movement of the sludge drawing tool 2, the driving wheel 4a is reversed. As a result, the pulling portion 5a that has been in contact with one engagement portion (7a for example) moves on the straight line and comes into contact with another engagement portion (7c for example) arranged on same the straight line, so that the traveling direction of the sludge drawing tool 2 is reversed. As a result, the traveling direction can be reversed at any desired position during the movement of the sludge drawing tool 2. This is advantageous in terms of improving the maintainability of the sludge treatment apparatus 1 is improved and making an unexpected situation easier to be handled.

The sludge drawing tool 2 according to the present embodiment is configured as follows. Specifically, the slide portion 7 slidable with respect to the carriage 6 is provided for causing the pulling of the sludge drawing tool 2 with the slide portion 7 as starting point. The link mechanism 10 is provided to couple the slide portion 7 and the scraper 8 to each other. Thus, automatic upward and downward movement of the scraper 8 linked with the forward movement of the sludge drawing tool 2 can be implemented using the power transmitted via the chain 5. The upward and downward movement can be implemented with a mechanical mechanism without providing the sludge drawing tool 2 with a driving source (such as a motor). This is advantageous in that the sludge treatment apparatus 1 can have a higher durability and maintainability.

The sludge drawing tool 2 according to the present embodiment is further configured as follows. Specifically, the slide portion 7 is provided on the lower side of the carriage 6, and the chain 5 is provided through the inside of the slide portion 7. As a result, the sludge drawing tool 2 can have a low height, so as to be effectively prevented from interfering with other members in the tank (such as an inclined plate enabling swift sinking of the sludge in the water).

In the embodiment described above, the sludge drawing tool 2 is provided with the raising and lowering mechanism including the slide portion 7 and the link mechanism 10 so that the scraper 8 can be raised and lowered with the power supplied from the chain 5. Such a raising and lowering mechanism needs not to be provided in cases such as a case where the power is externally supplied from a system different from the chain 5 or a case where the sludge drawing tool 2 is provided with a driving source for the upward and downward movement.

REFERENCE SIGNS LIST

1 Sludge treatment apparatus
2 Sludge drawing tool
3 Rail
4a Driving wheel
4b Driven wheel
5 Chain
5a Pulling portion
6 Carriage
6a Wheel
6b Protruding portion
7 Slide portion
7a to 7d Engagement portion
7e Guide groove
8 Scraper
9 Rotation shaft 10 Link mechanism
11, 11' Stopper
11a, 11b Arm
11c Contact portion

The invention claimed is:

1. A sludge treatment apparatus comprising:
a pair of wheels including a driving wheel;
a power transmission member that is endlessly formed, wound around the pair of wheels, and includes a first straight line and a second straight line extending between the pair of wheels;
a moving body that is provided to be able to move forward between the pair of wheels and includes a scraper for drawing in sludge;
a pulling portion provided to the power transmission member; and
first to fourth engagement portions that are provided to the moving body and have a shape enabling the pulling portion that circumferentially moves along the power transmission member to engage with and to be disengaged from the engagement portions, wherein
the first engagement portion is provided near the first straight line, and comes into contact with the pulling portion moving on the first straight line in one direction to make the moving body move in the one direction when the driving wheel rotates in one direction,
the second engagement portion is provided near the second straight line, and comes into contact with the pulling portion moving in an opposite direction on the second straight line to make the moving body move in the opposite direction when the driving wheel rotates in the one direction,
the third engagement portion is provided near the first straight line and at a position different from the first engagement portion, and comes into contact with the pulling portion moving in the opposite direction on the first straight line to move the moving body in the opposite direction when the driving wheel rotates in an opposite direction, and
the fourth engagement portion is provided near the second straight line and at a position different from the second engagement portion, and comes into contact with the pulling portion moving in the one direction on the second straight line to make the moving body move in the one direction when the driving wheel rotates in the opposite direction.

2. The sludge treatment apparatus according to claim 1, wherein
the third engagement portion is provided at a position opposite to the second engagement portion, and
the fourth engagement portion is provided at a position opposite to the first engagement portion.

3. The sludge treatment apparatus according to claim 2, wherein
the third engagement portion is shaped to be line symmetrical with the second engagement portion with respect to an axis of symmetry connecting center axes of the pair of wheels, and
the fourth engagement portion is shaped to be line symmetrical with the first engagement portion with respect to the axis of symmetry.

4. The sludge treatment apparatus according to claim 1, wherein
the moving body includes
a carriage to which the scraper is rotatably attached, the carriage having a wheel for moving on a rail;
a slide portion that is provided to the carriage to be slidable within a predetermined movable range, and includes the first to the fourth engagement portions, and
a link mechanism that couples the slide portion and the scraper to each other and makes the scraper rotate in accordance with sliding of the slide portion with respect to the carriage.

5. The sludge treatment apparatus according to claim 4, wherein
the slide portion is attached on a lower side of the carriage, and
the power transmission member is provided through an inside of the slide portion.

* * * * *